United States Patent [19]

Howard et al.

[11] Patent Number: 5,760,926

[45] Date of Patent: Jun. 2, 1998

[54] APPARATUS FOR UTILIZING A SINGLE PAPER PATH FOR SCANNING, FAXING, COPYING, AND PRINTING

[75] Inventors: John Avery Howard, Palo Alto, Calif.; William Ronald George, Chicago, Ill.; Donald S. Minami, Monte Sereno, Calif.; Lan Hao-Jui, Taipei, Taiwan; Tsai Cheng-Liang, Fu-Chien, China

[73] Assignee: Apple Computer, Inc., Cupertino, Calif.

[21] Appl. No.: 545,953

[22] Filed: Oct. 20, 1996

[51] Int. Cl.$^6$ ..................................... H04N 1/04
[52] U.S. Cl. .................. 358/498; 358/472; 358/474
[58] Field of Search ........................ 358/472, 494, 358/496, 498, 474; H04N 1/04

[56] References Cited

U.S. PATENT DOCUMENTS

| | | | |
|---|---|---|---|
| 5,105,279 | 4/1992 | Kamada et al. | 358/472 |
| 5,206,745 | 4/1993 | Yamada et al. | 358/498 |
| 5,264,949 | 11/1993 | Stemmle | 358/472 |
| 5,420,697 | 5/1995 | Tuli | 358/472 |
| 5,539,538 | 7/1996 | Terao | 358/472 |
| 5,570,205 | 10/1996 | Sugita et al. | 358/472 |

*Primary Examiner*—Thomas L. Stoll
*Attorney, Agent, or Firm*—Blakely, Sokoloff, Taylor & Zafman

[57] ABSTRACT

Apparatus for utilizing a single paper path for printing, copying, scanning, and sending and receiving facsimiles by combining a gear box assembly and an adjustable scan head assembly with a conventional printer. The invention contemplates a first position for scanning, copying, and sending facsimiles of an image, and a second position for printing, reproducing a copied image, and receiving facsimiles. In the first position, the path of a single sheet of paper is impeded by the scan head mechanism. In the second position, a sheet of paper onto which an image has been transferred by dot matrix, ink, or laser printing, can move through the multi-purpose information transfer device unimpeded. The invention contemplates a single stationary path to which information transfer functions are added and taken away, instead of multiple paths to accommodate stationary information transfer functions.

20 Claims, 8 Drawing Sheets

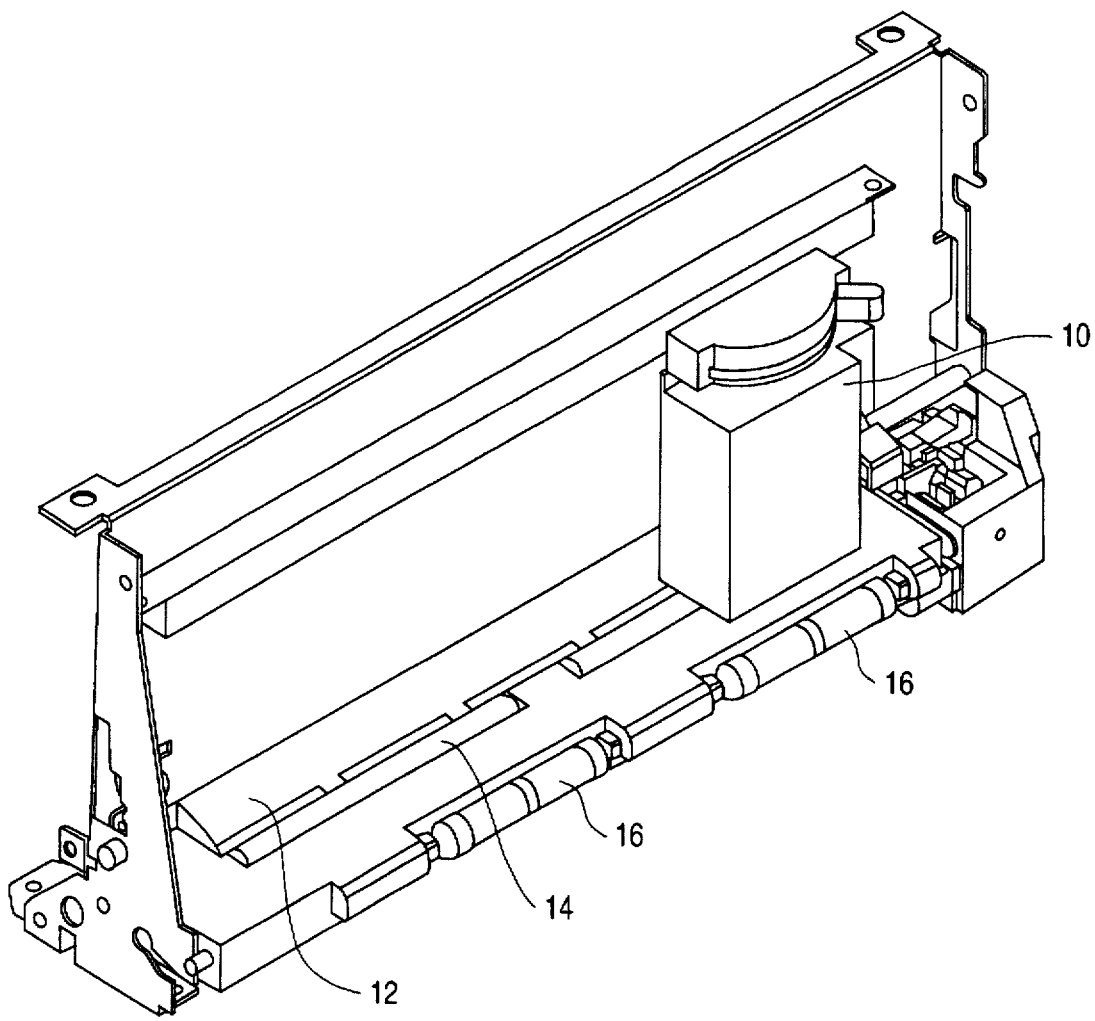
FIG_1
(PRIOR ART)
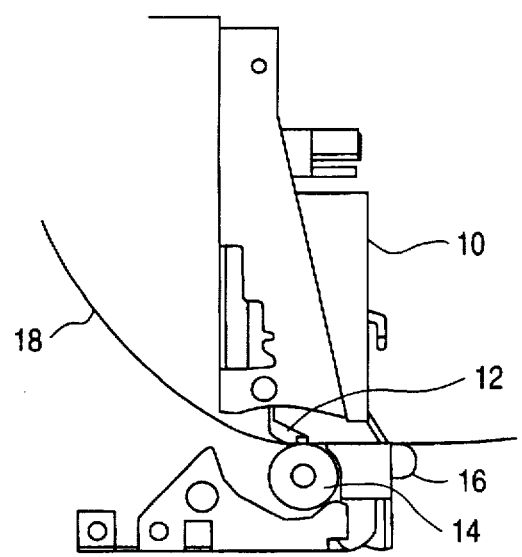
FIG_2
(PRIOR ART)

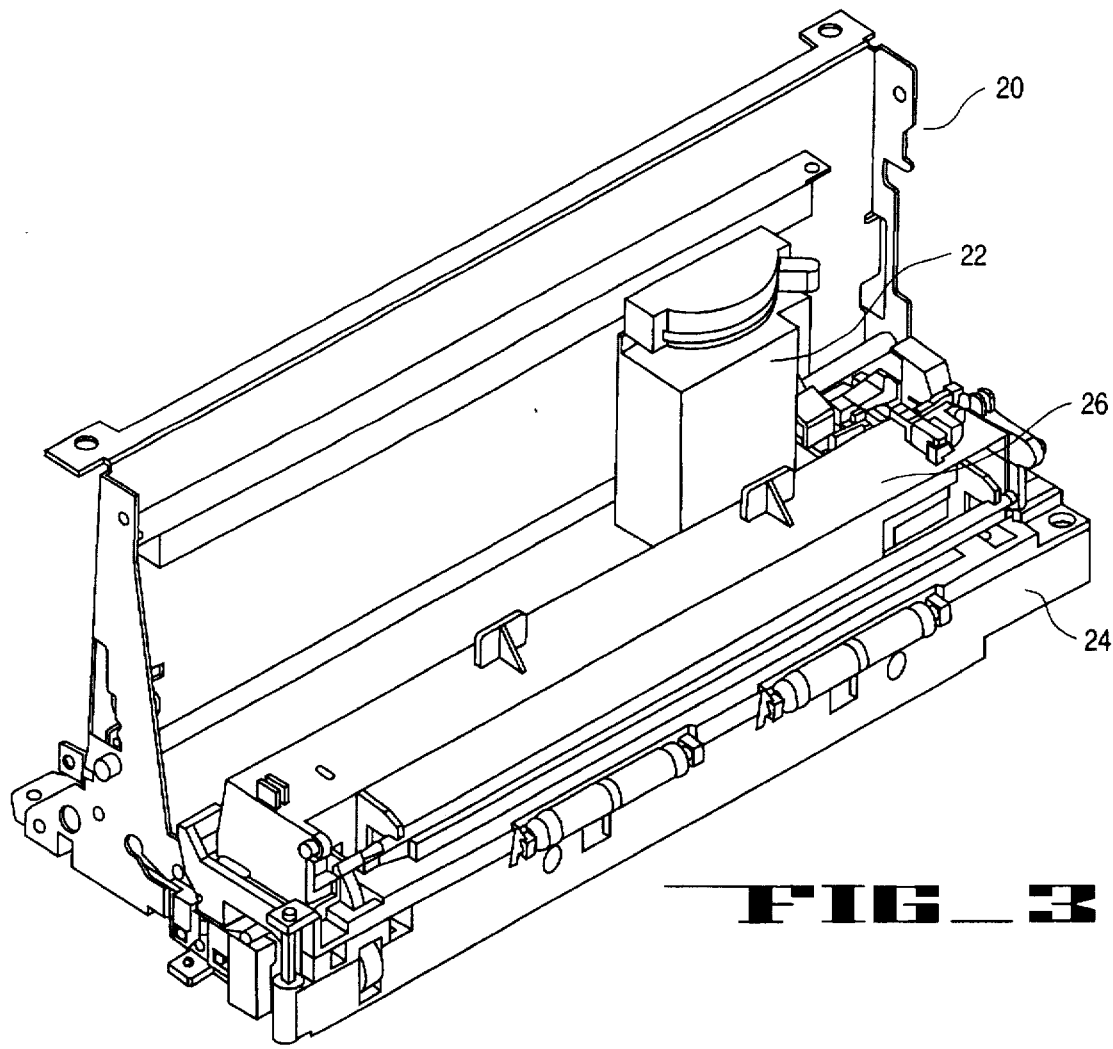
FIG_3
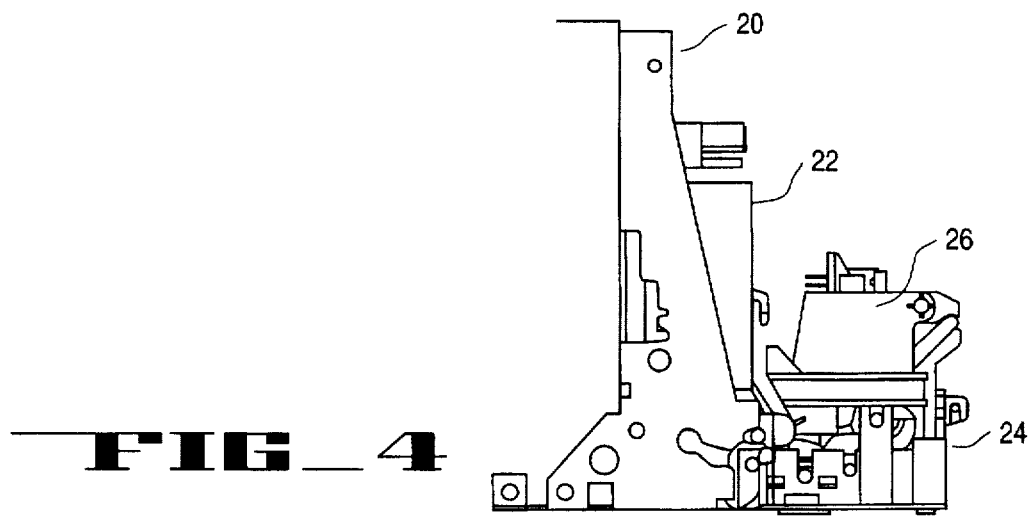
FIG_4

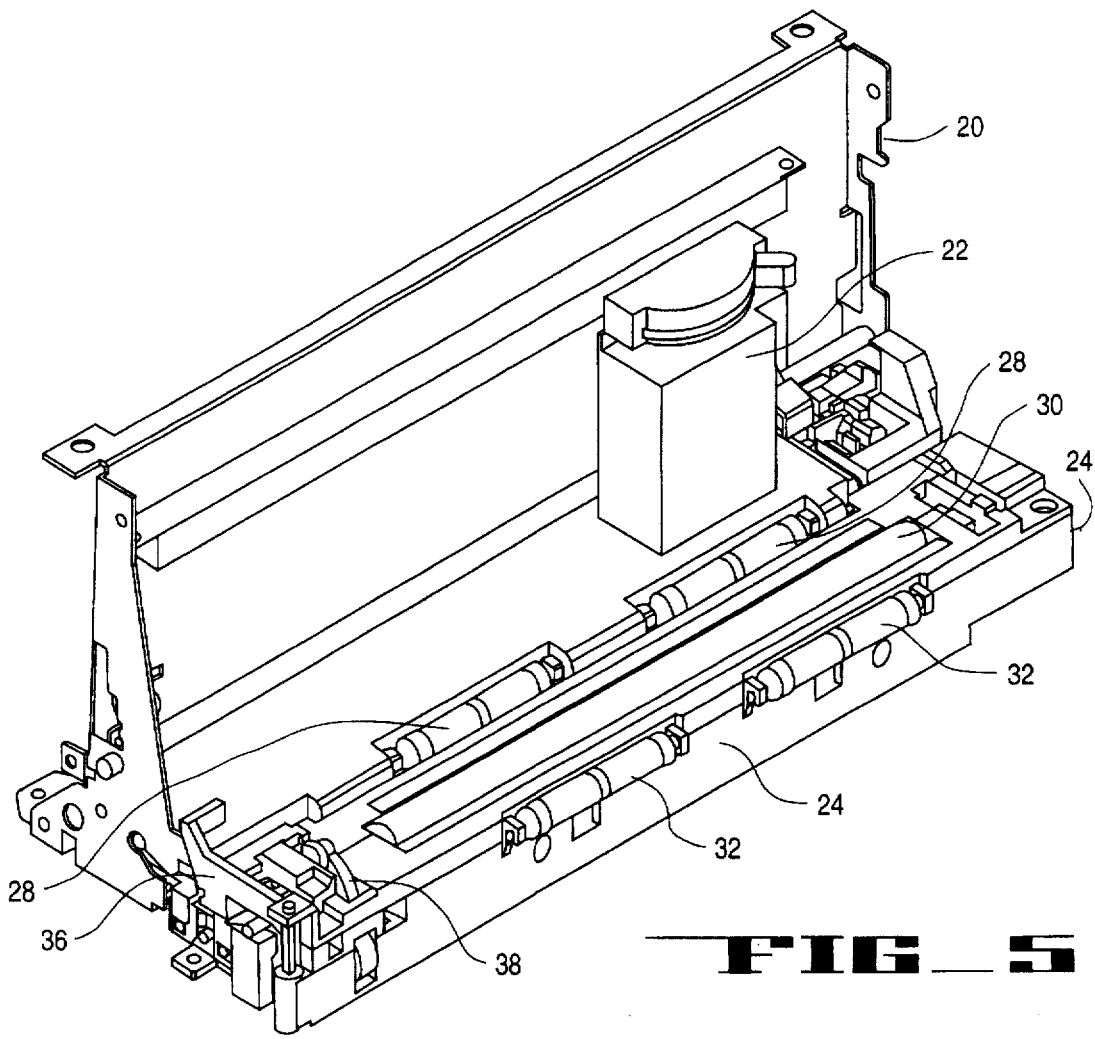
FIG_5
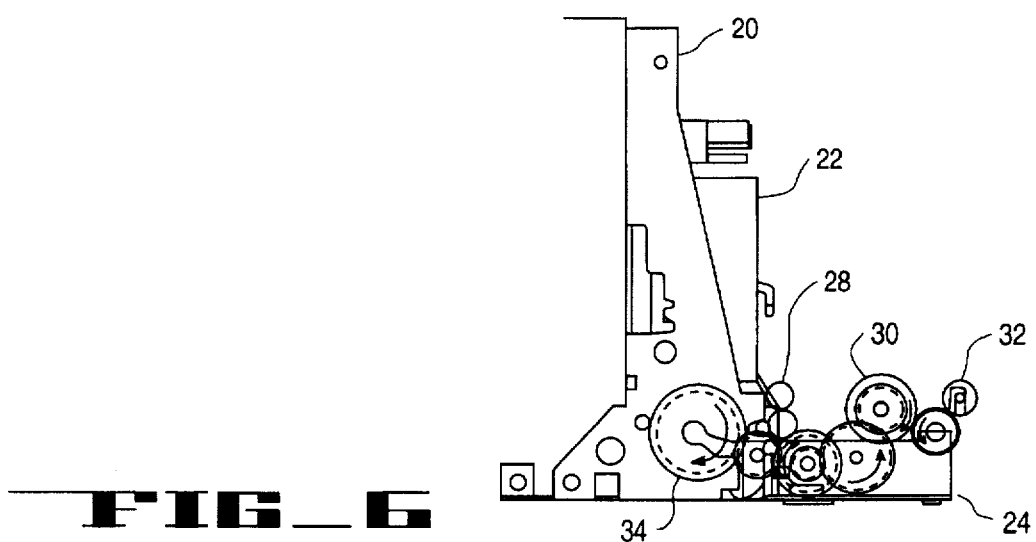
FIG_6

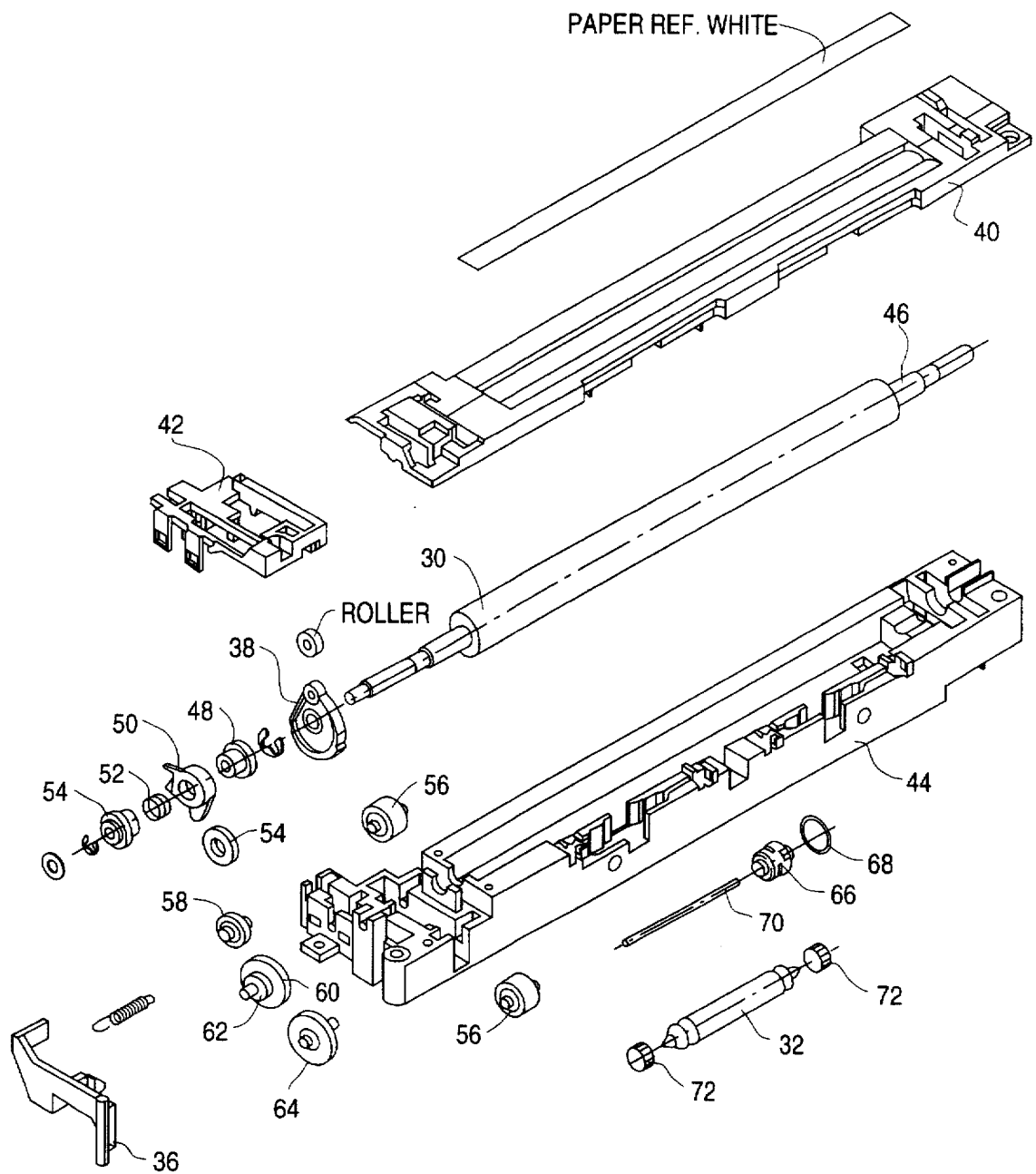
FIG_7

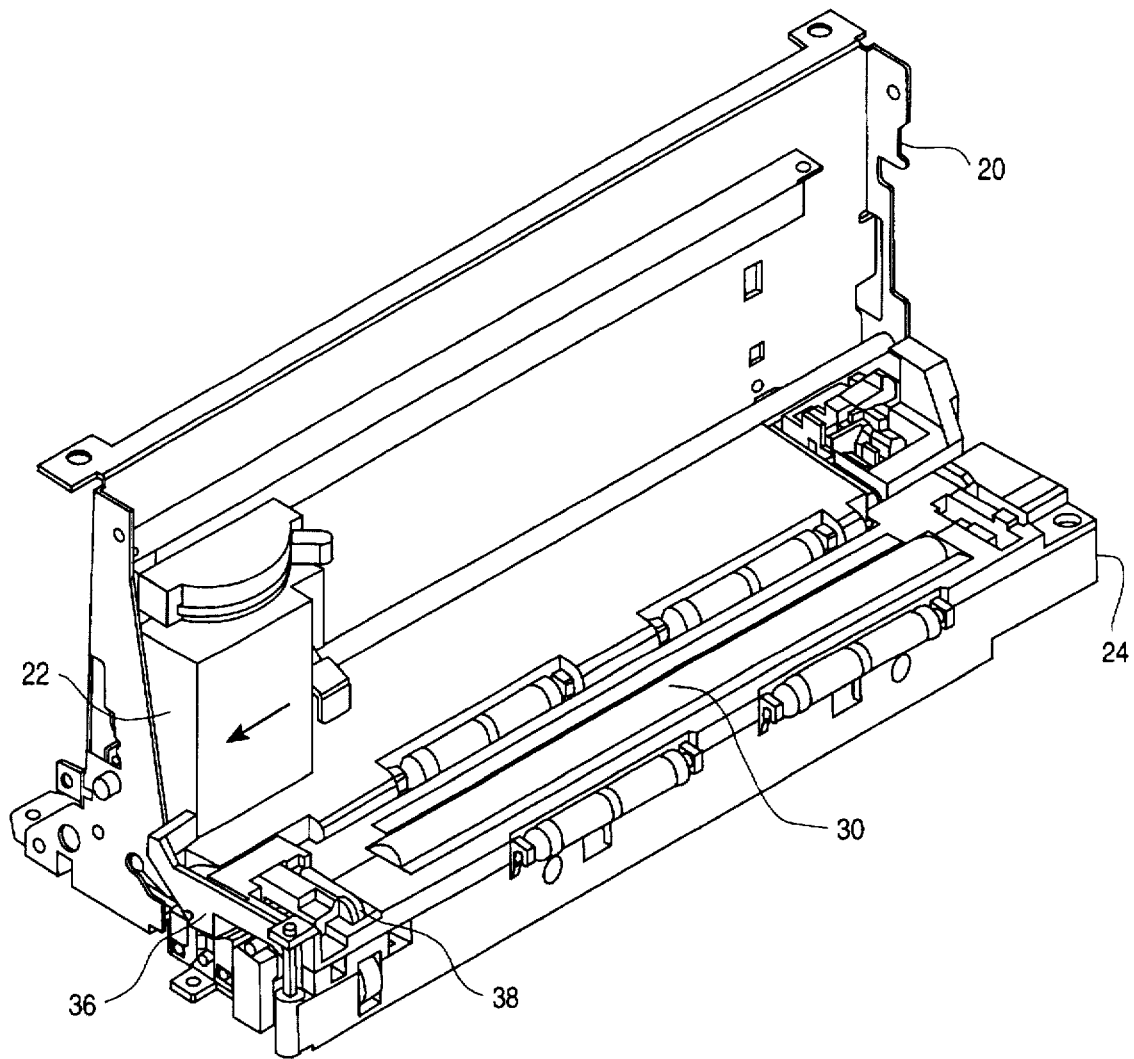
FIG_8

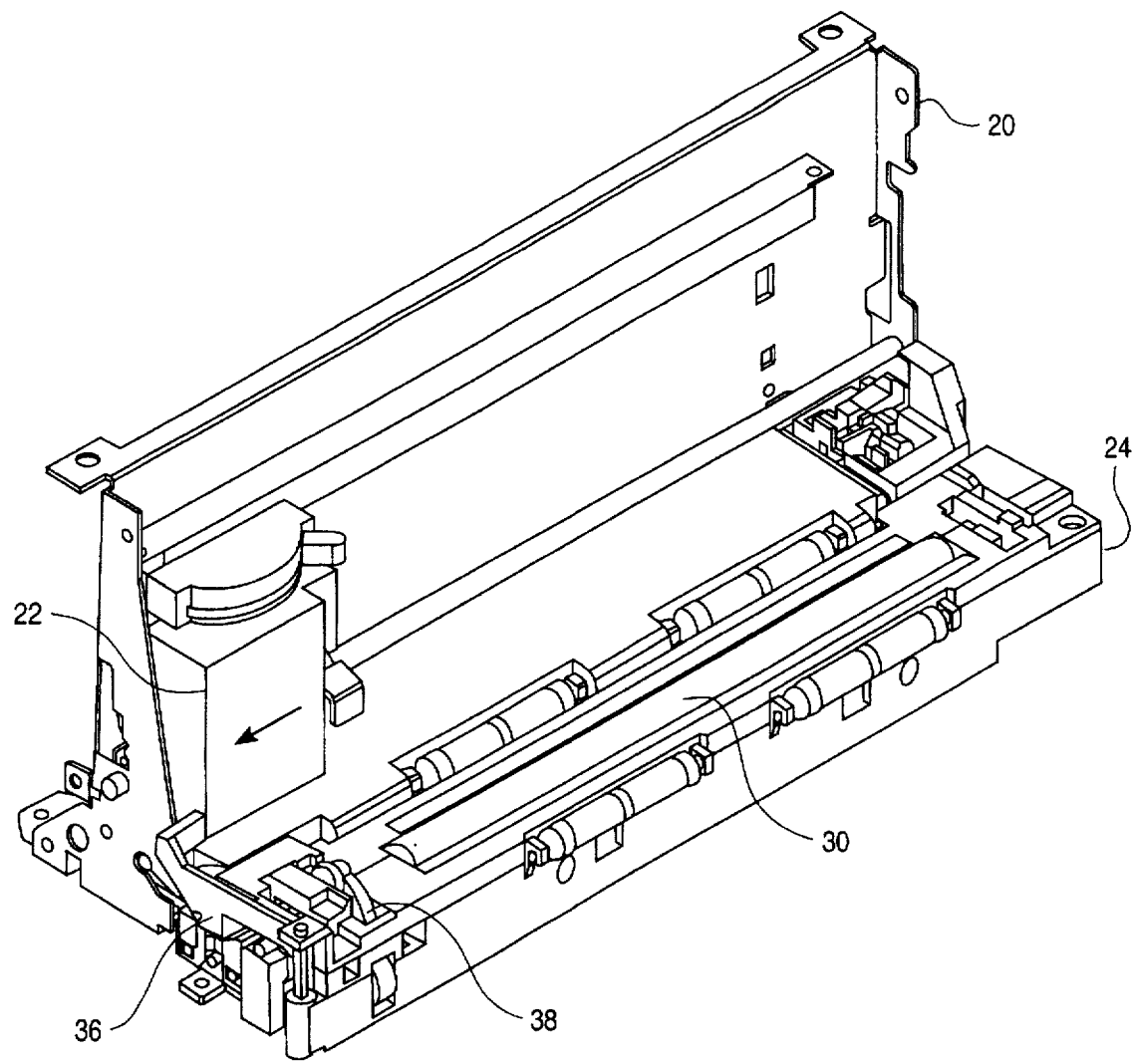
FIG_9

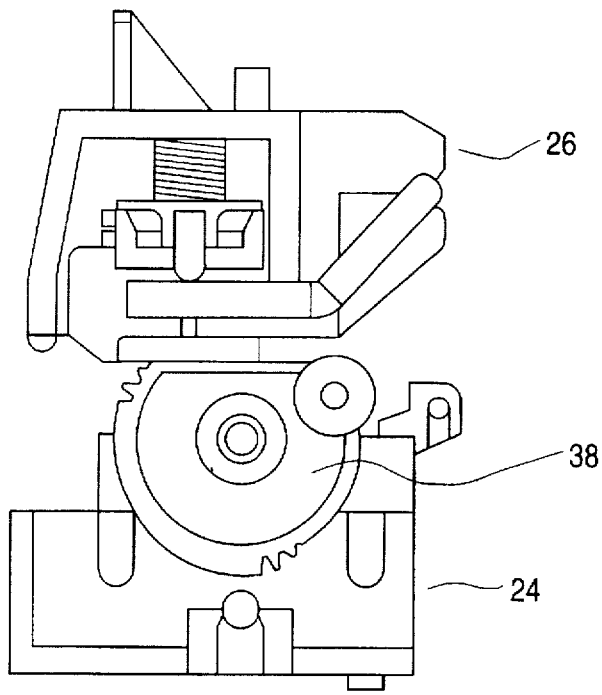
FIG_10
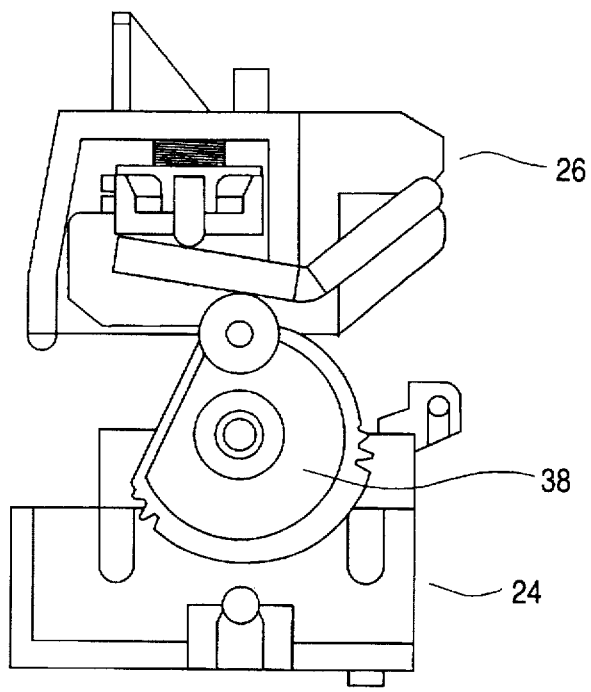
FIG_11

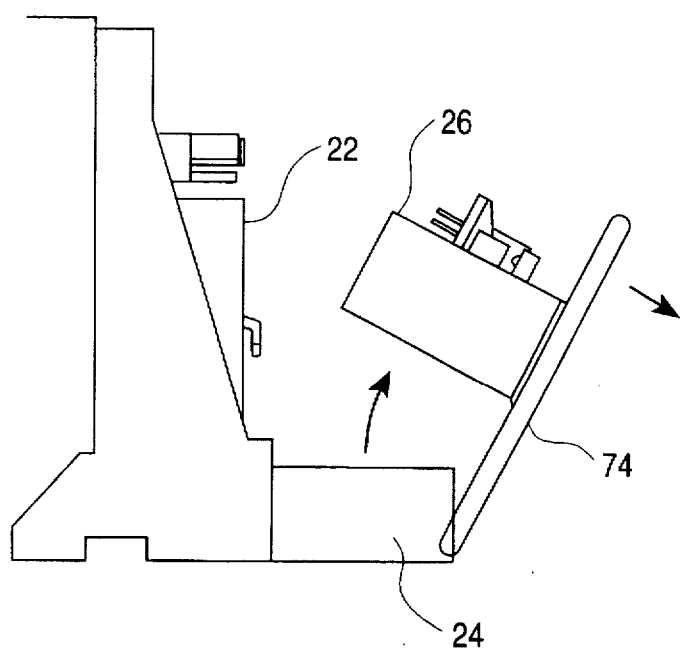
FIG_12

APPARATUS FOR UTILIZING A SINGLE PAPER PATH FOR SCANNING, FAXING, COPYING, AND PRINTING

FIELD OF THE INVENTION

The invention relates generally to computer workstations, and more particularly to multipurpose information transfer devices, i.e., scanning, facsimile sending and receiving, copying, and printing and the mechanisms for accomplishing these tasks.

BACKGROUND OF THE INVENTION

Information transfer devices include scanning devices for electronically or optically sensing a recorded image for later modification, facsimile devices for electronically sending or receiving an image over a voice frequency circuit, printing devices for producing a recorded image, and copying devices for reproducing a recorded image. Collectively, these devices represent a considerable cost and occupy considerable physical space in a desk or office. Thus, effort has been focused at information transfer devices that can accomplish multiple tasks (i.e., scanning, faxing, copying, and/or printing) at a lower cost and smaller space requirement.

One way that information transfer devices combine printing, faxing, copying, and scanning is by using the scan head mechanism of a scanning device to receive an image and then processing the image to an electronic image (scanning function), to a separate location over a voice frequency circuit (facsimile function), or to a reproduction with the aid of a printing device (copying function). The printing device may also be used to print electronically generated documents, e.g., computer files.

Typical printing devices include dot matrix, ink, and laser printers. Dot matrix printers generate characters on a page with a matrix of dots and the aid of an inked ribbon. Ink printers utilize a motor to drive a wet ink marker or pen across a page to generate characters on the page. The Apple Stylewriter Inkjet printer series, for example, utilizes a motor to drive a carriage containing a marker or pen, back and forth along the width of a sheet of paper according to electronically received information, e.g., from a computer. A second motor drives a D-roller and a platen roller to move paper from a single paper tray through the printer. The other commonly used printing device, the laser printer, utilizes a low-powered laser to produce image forming charges on the photoconductive surface of a drum. Dry powder is then allowed to adhere to the charged areas, and the image of the drum is transferred to paper, and the dry powder is fused to the paper with heat.

Information transfer devices that combine printing, faxing, copying, and scanning use multiple paper paths to accomplish their multiple tasks. For example, there may be a single paper path for printing or copying, and another for sending or receiving facsimiles and scanning. Multiple paper path devices translate into considerable physical space to accommodate, for example, a distinct paper path for faxing, scanning, copying or printing. Multiple paper paths translate into additional trays to house the separate paper, and multiple motors and multiple drive trains to move separate paper through separate paper paths. In addition to the increased space consideration, multiple paper paths also add an increased cost dynamic. The additional components needed to operate multiple paper paths translates into additional costs.

Multiple paper paths increase the difficulty of accessing the paper path for clearing paper jams. The intricate paths multiply the potential hiding spots for paper that for one reason or another became stranded or stuck inside the device. Major components of the device often have to be removed or relocated to access a stranded or stuck sheet of paper. Multiple paper paths with multiple motors and drive trains means there are multiple places for paper to become stuck or jammed.

Multipurpose information transfer devices that use the ink printing device also need two paper paths to avoid smearing of a freshly printed document. Ink printing devices print wet. When an ink printed document is created, the document must move through the information transfer device without contacting the printed words or image with a mechanical part of the information transfer device.

Finally, many multipurpose information devices do not utilize plain paper for all their functions. For example, many use thinner, more inferior, paper stock to access functions like faxing or copying.

SUMMARY AND OBJECTS OF THE INVENTION

The invention incorporates a single paper path for plain paper printing, copying, scanning, and sending and receiving facsimile transmissions by combining a gear box assembly and an adjustable scan head with a conventional printer. The gear box assembly of the invention is engaged to the platen roller motor of the printer chassis. The scan head assembly is slidably coupled to the printer chassis in such a way to define the paper path between the gear box assembly and the scan head assembly. The apparatus of the invention utilizes a scan head assembly to receive an image and process the image to either an electronic image (scanning function), to a separate location over a voice frequency circuit (facsimile function), or to a reproduction (copying function).

The invention contemplates a first position for scanning, copying an original, and sending facsimiles, and a second position for printing, reproducing a copied image, and receiving facsimiles. In the first position, the path of a single sheet of paper is impeded by the scan head assembly so that paper cannot travel past the scan head assembly without coming in contact with or in close proximity to the scan head assembly. In the second position, a sheet of paper onto which an image has been transferred by dot matrix, ink, or laser printing, can move through the multipurpose information system unimpeded, i.e., with no chance of contact with the scan head assembly. Thus, the invention contemplates a single stationary path to which information transfer functions are added and taken away, instead of multiple paths to accommodate stationary information transfer functions. The advantages to the invention are physical space, economic cost, and paper handling.

The single paper path of the invention uses less physical space than multiple paper path transfer devices. Multiple paper path transfer devices require the physical space requirements within a device to move separate paper through the device, in addition to the additional rollers and drive gears associated with paper movement. The invention has only a single paper path and the physical space requirements of the invention are only those required for the single paper path.

The invention also makes parasitic use of a single motor and drive train to operate all paper movement through the information transfer device, e.g., printing, copying, scanning, and sending and receiving facsimiles. In other words, the instant invention utilizes the same motor to move a sheet of paper through a dot matrix, ink, or laser printer and to raise and lower the scan head mechanism. Thus, the invention contemplates the accomplishment of all its information transfer functions with a single motor to move the sheet of paper through the device and place the device in a position to accomplish any of its multiple tasks. The parasitic use of a single motor and drive train occupies smaller physical space requirements at lower cost requirements than other information transfer devices that utilize a series of motors to move paper through a series of paper paths to accomplish different functions. The parasitic use of a single motor makes the invention more compact and more economical than other information transfer devices.

The single paper path design of the invention also creates a multifunction information transfer device that allows easy access for clearing paper jams. All paper comes through the same simple path and is easily accessible to sight and hand. Other multi-path, multifunction information devices have intricate paths to get a sheet of paper to a particular function. The invention contemplates a single simple path that can be easily examined for stranded or stuck paper without the removal of any system component.

The multipurpose information transfer device incorporated into the invention is particularly useful for devices that utilize the features of ink printing. Ink printers are often favored over more expensive laser printers, because of the reduced space constraints of an ink printer. The Apple Stylewriter series Inkjet printers, for example, are compact units utilizing only a single paper path for printing and a head carriage to hold an ink marker or pen. Laser printers, on the other hand, generally have a large photoconductive drum and a heating element associated with the laser printer. The invention contemplates that the transformance of an ink printer to an ink printer-multipurpose information transfer system demands relatively little additional space. Thus, an already compact printing system relative to the larger laser printer can maintain its compactness as a multipurpose information transfer device.

The invention can also accomplish the printing objectives of the ink printer within the multipurpose device without smearing or smudging any of the printer ink that has been transferred to the printed page. The invention can accomplish smear- or smudge-free printing because the invention contemplates that information transfer functions are added and taken away, so that when wet ink has been applied by an ink printing, any impedance that might smear or smudge the printing is removed from the path of the paper. An image created on a sheet of paper can move through the entire system without any impedance.

In summary, the single paper path-multipurpose information device that is the invention occupies less physical space, is more economical and is easier to access paper jams than, and as accommodating to smear- or smudge-free ink printing as multitray-multipurpose information devices.

Other objects, features, and advantages of the invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements and in which:

FIG. 1 is a front perspective view of the prior art Stylewriter Inkjet printer.

FIG. 2 is a side view of the prior art Stylewriter Inkjet printer.

FIG. 3 is a front perspective view of the printer chassis, the scan head, and the gear box assembly of the apparatus of the invention.

FIG. 4 is a side view of the printer chassis, the scan head, and the gear box assembly of the apparatus of the invention.

FIG. 5 is a front perspective view of the printer chassis and the gear box assembly of the apparatus of the invention.

FIG. 6 is a side view of the printer chassis and the gear box assembly of the apparatus of the invention.

FIG. 7 is an exploded perspective view of the gear box assembly of the invention.

FIG. 8 is a front perspective view of the printer chassis and the gear box assembly of the apparatus of the invention actuated to the scanning, copying, or faxing mode.

FIG. 9 is a front perspective view of the printer chassis and the gear box assembly of the apparatus of the invention actuated to the printing mode.

FIG. 10 is side view of the apparatus of the invention in the scanning, copying, or faxing mode.

FIG. 11 is a side view of the apparatus of the invention in the printing mode.

FIG. 12 is a side view of the invention including a front access door wherein the scan head assembly is coupled to the front access door and pivoted away from the gear box assembly.

DETAILED DESCRIPTION

The invention is an apparatus for utilizing a single paper path for scanning, sending and receiving facsimiles, copying, and printing. The invention contemplates a first position for scanning, copying an original, and sending facsimiles, and a second position for printing, reproducing a copied image, and receiving facsimiles. In the first position, the path of a single sheet of paper is impeded by the scan head mechanism. In the second position, a sheet of paper onto which an image has been transferred by dot matrix, ink, or laser printing, can move through the multipurpose information device unimpeded. Thus, the invention contemplates a single stationary path to which information transfer functions are added and taken away. The advantages to the invention are physical space, fewer mechanical parts, economic cost, and improved paper handling.

The apparatus comprises a printer chassis, a gear box assembly, and a scan head assembly. The gear box assembly of the invention is engaged to a motor of the printer chassis. The scan head assembly is slidably coupled to the printer chassis in such a way to define the paper path between the gear box assembly and the scan head assembly. The apparatus can use a single paper path for multiple operations (scanning, facsimile transmitting, copying, ink printing) because the invention contemplates that the scan head assembly moves between a first position and a second position depending on the operation being performed. In other words, the invention contemplates that the scan head assembly will be in a first position for receiving information by way of scanning or copying or sending by facsimile a generated image. The scan head will be in a second position for printing, reproducing a copied image, and receiving facsimiles. According to this configuration, the apparatus incorporates plain-paper functionality to multiple operations through a single paper path.

In one embodiment contemplated by the invention, the printer chassis is based on the design of the Apple Stylewriter series Inkjet printer and notably includes a plain paper tray, a head carriage to hold an ink printing cartridge, a platen roller, and a motor to drive the head carriage and a motor to drive the platen roller. The gear box assembly of the invention is engaged to the platen roller motor of the printer chassis. The scan head assembly is slidably coupled to the printer chassis in such a way to define the paper path between the gear box assembly and the scan head assembly. The apparatus of the invention utilizes a scan head assembly to receive an image and process the image to either an electronic image (scanning function), to a separate location over a voice frequency circuit (facsimile function), or to a reproduction (copying function).

The apparatus can use a single paper path for multiple operations (scanning, facsimile transmitting, copying, ink printing) because the invention contemplates that the scan head assembly moves between a first position and a second position depending on the operation being performed. In other words, the invention contemplates that the scan head assembly will be in a first position for receiving information by way of scanning or copying or sending by facsimile a document generated by means other than an electronically-linked computer workstation. The scan head will be in a second position for ink reproducing of a copied image, an image received by facsimile transmission, or an image generated by an electronically-linked computer workstation.

Other multi-task machines that include ink printing require a separate contact-free paper path to prevent smearing or smudging of the wet ink resulting from the printing process. Rather than construct a separate paper path, with its attendant rollers, drivers, and trays, the invention eliminates contact with the printed side of the paper after ink printing by moving the obstacles that otherwise could contact the paper as the paper travels through its path. Thus, by moving the scan head assembly out of direct contact with the paper during the ink printing mode, the apparatus can accomplish smear- or smudge-free ink printing.

The invention further contemplates the use of only a single motor to drive the mechanisms that move the paper from the paper tray of the printer chassis through the multitask system. The conventional Apple Stylewriter printer uses the same motor to select a sheet of plain paper from the paper tray (by actuating a D-roller) and to drive a first platen roller that moves the selected sheet through the ink printer. The invention contemplates that the same motor is parasitically used to select a sheet of paper and move the selected paper through the printing mode as well as through the other functions of the multitask system and to move obstacles that might smear or smudge the printed product.

FIG. 1 presents a perspective view of a portion of the Apple Stylewriter printer chassis. FIG. 1 shows the inkjet head carriage 10 that houses the inkjet head cartridge for ink printing. The carriage 10 is actuated back and forth across the width of the printer chassis by means of a head carriage guide controlled by a motor. FIG. 1 also shows a platen 12, a first platen roller 14, and exit rollers 16. The platen roller 14 and exit rollers 16 are engaged by a gear train (not shown) and rotated at substantially the same velocity by a motor (not shown). An individual sheet of plain paper is selected from a paper tray (not shown) by a D-roller (not shown) and moved to a position between the platen 12 and the first platen roller 14. The paper is further moved forward (i.e., toward the exit rollers 16) by the first platen roller 14. The inkjet head cartridge 10 moves over the paper and the inkjet head cartridge deposits ink onto a single side of the selected sheet of paper according to some internal or external instructions. The paper is still further moved forward by the platen roller 14 and eventually the exit rollers 16 until the entire length of the selected sheet of paper is moved past the exit rollers 16.

FIG. 2 presents a side view of a portion of the Apple Stylewriter printer. FIG. 2 shows the paper path by showing an individual sheet of paper 18 extending under the platen 12, over the platen roller 14, and past the exit rollers 16.

FIGS. 3–11 present an embodiment of the invention utilizing the Apple Stylewriter series inkjet printing mechanism. The depiction of the invention utilizing an ink printer is not meant to limit the invention to this printing mechanism. Instead, the invention contemplates usefulness with all printing mechanisms, including dot matrix and laser printers.

FIG. 3 presents a front perspective view of an embodiment of the instant invention utilizing an ink printing mechanism. According to this embodiment, a printer chassis 20 includes a plain paper tray (not shown), a head carriage 22 to hold an ink printing cartridge, a first platen roller (not shown), a first set of exit rollers, a motor to drive the head carriage, and a motor to drive the first platen roller. A gear box assembly 24 is coupled to the front of the printer chassis 20 and engaged through a gear train to the platen roller motor of the printer chassis 20. A scan head assembly 26 is situated above the gear box assembly and is slidably coupled to the printer chassis. A paper path is defined between the gear box assembly 24 and the scan head assembly 26.

FIG. 4 presents a side view of the embodiment of the invention utilizing an ink printer. The side view demonstrates the coupling of the gear box assembly to the printer chassis 20 and also demonstrates that the gear box assembly 24 is engaged to the platen roller motor of the printer chassis 20.

According to the embodiment illustrated in FIGS. 3 and 4, paper travels through the apparatus in the same direction regardless of function. Paper travels from the paper tray (not shown) of the paper chassis 20 past the head carriage and then between the gear box assembly 24 and the scan head assembly 26 regardless of whether the scan head assembly 26 is in a first position to receive and process an image or a second idle position.

FIG. 5 shows a front perspective view of a portion of an embodiment of the invention utilizing an ink printing mechanism. FIG. 5 is a cut away view of the printer chassis 20 and the gear box assembly 24. This view shows the ink head carriage 22 slidably coupled to the printer chassis 20. A second platen roller 30 is seated in the gear box assembly 24 and extends substantially the length of the gear box assembly 24. On either side of the platen roller are pairs of exit rollers 28, 32. The gear box assembly 24 is engaged through a gear chain to the platen roller motor such that the first platen roller (not shown), the second platen roller 30, and the two pairs of exit rollers 28, 32 rotate in the same direction and at substantially the same velocity to move a sheet of paper through the apparatus.

A lock lever 36 with two ends is pivotally coupled at its middle to the gear box assembly 24. One end of the lock lever 36 is in the path of the head carriage 22 and is rotated about its middle when contacted by the head carriage 22. The rotation of the lock lever 36 by the head carriage 22 serves to raise or lower a sector gear 38. The position of the sector gear 38, in turn, determines the position of the scan head assembly.

FIG. 6 represents a side view of the gear box assembly 24 and the printer chassis 20, demonstrating the gear chain. A first drive gear 34 is coupled at its center to the first platen roller (not shown) that is engaged to a platen roller motor. The first drive gear 34 is further engaged to a series of gears that engage and rotate the pairs of exit rollers 28, 32 and the second platen roller 30 in the same direction at substantially the same velocity as the first platen roller.

FIG. 7 represents an exploded view of the gear box assembly. The larger components of the gear box assembly include a gear cradle 44, a second platen roller shaft 46, a second platen roller 30, a roller cradle 40, and a gear cover 42. A lock lever 36 is pivotally coupled at its middle to the base of the gear cradle 44. One end of the lock lever 36 is in the path of the head carriage (not shown) and is rotated when contacted by the head carriage. The other end of the lock lever may be connected to an opti-electrical sensor wherein the sensor senses the position of the scan head based on the position of the lock lever. The second platen roller 30 is connected through its center to the second platen roller shaft 46. The second platen roller shaft 46 is engaged through a gear chain to the platen roller motor. At one end of the second platen roller shaft 46 is a sector gear 38, a first floating gear 48, a winged carriage 50, a clutch spring 52, and a second floating gear 54.

When actuated by the head carriage, the lock lever 36 engages the winged carriage 50 by engaging the second floating gear 54 that depresses the clutch spring 52 that causes the winged carriage 50 and the first floating gear 48 to rotate about the second platen roller shaft 46. The position of the winged carriage 50 determines the position of the scan head assembly (not shown). The position of winged carriage 50 is selected by momentarily rotating the second platen roller shaft 46 in either a clockwise or counterclockwise direction (by the motor rotation) when the winged carriage 50 is engaged. Thus, depending on the operation to be performed (i.e., printing, or copying, scanning), the second platen roller shaft 46 and thus, the winged carriage 50 rotates momentarily in either a clockwise or counterclockwise direction. On either side of the winged carriage 50 rests an idler 56, each idler 56 engaged to the sector gear 38. Depending on the momentary rotation of the second platen roller shaft 46, the winged carriage 50 engages a gear 54 that engages either idler 56 to rotate the sector gear 38. The rotation of the sector gear 38 moves the scan head assembly from a first position to a second position or from a second position to a first position.

Once the scan head assembly is in the desired first or second position, the head carriage releases the lock lever 36, the lock lever 36 releases the clutch spring 52, and the winged carriage 50 will not rotate when the second platen roller shaft 46 rotates and moves a selected sheet of plain paper through the mechanism.

The rotation of the second platen roller shaft 46 is driven by the platen roller motor (not shown). A series of gears 58, 60, 62, 64 are parasitically engaged to the platen roller motor to drive the second platen roller shaft 46 at substantially the same velocity as the first platen roller. These gears 58, 60, 62, 64 also serve to momentarily rotate the second platen roller shaft 46 in either a clockwise or counter clockwise direction to place the scan head assembly in the desired first or second position. Finally, the exit rollers 32 are also rotated indirectly by the platen roller motor to turn at substantially the same velocity as the first platen roller and the second platen roller 30. Specifically, roller 68 is radially connected to and surrounds roller 66 that rotates on shaft 70. Roller 68 radially contacts the second platen roller 30 which rotates the mechanism comprised of roller 68, roller 66, and shaft 70. Roller 68 also radially contacts exit roller 32, so that when the second platen roller 30 rotates, the exit roller 32 rotates in the same direction and at substantially the same velocity as the second platen roller 30. In the embodiment shown in FIG. 7, flexible rollers 72 are radially connected to the exit roller 32 so that paper passing across the exit roller 32 contacts the flexible rollers 72.

FIGS. 8 and 9 present a front perspective view of a portion of an embodiment of the invention showing the printer chassis 20 and the gear box assembly 24. FIG. 8 shows the invention ready to move from a scanning mode to a printing mode; the sector gear is flush with the plane defined by the second platen roller 30 and the top of the gear box assembly 24. The head carriage 22 actuates the lock lever 36. The lock lever engages the winged carriage (not shown) that drives an idler gear (not shown). In this instance, the second platen roller shaft (not shown) rotates in a clockwise direction to rotate the sector gear 38 and move the scan head assembly from a first position for scanning or copying to a second position for printing. FIG. 9 shows the invention ready to move from a printing mode to a scanning mode; the sector gear is not flush with the plane defined by the second platen roller 30 and the top of the gear box assembly 24. Once again, the head carriage 22 actuates the lock lever 36 that engages the winged carriage (not shown) that drives an idler gear (not shown). The second platen roller shaft (not shown) rotates in a counterclockwise to rotate the sector gear 38 and move the gear head assembly from a second position for printing to a first position for scanning or copying.

FIGS. 10 and 11 represent cut-away side views of the gear box assembly 24 and the scan head assembly 26. The side views are cut-away to reveal the sector gear 38. In FIG. 10, the scan head assembly 26 of the apparatus is in the first position or the scanning or copying of an image mode. In this position, a sheet of paper containing an image travels from the paper tray (not shown) of the paper chassis and between the gear box assembly 24 and the scan head assembly 26. The image on the paper is received and processed by the scan head assembly 26 to an electronic image (scanning function), to a separate location over a voice frequency circuit (facsimile function), or to a reproduction (copying function).

In FIG. 11, the scan head assembly 26 of the apparatus is in the second position or the printing or reproducing of an image mode. It is evident from FIG. 11 that a sheet of plain paper can travel between the scan head assembly 26 and the gear box assembly 24 without coming into contact with the scan head assembly 26. In this position, an image free sheet of paper travels from the paper tray (not shown) of the paper chassis and between the gear box assembly 24 and the scan head assembly 26. The scan head assembly 26 is in an idle position while the apparatus is in a printing or reproducing mode.

FIG. 12 demonstrates an embodiment of the invention utilizing the ink-style printer wherein the scan head assembly 26 is slidably coupled to a front door 74 of the printer chassis. Opening the front door 74 to the apparatus, pivots the scan head assembly 26 away from the gear box assembly 24. By pivoting the scan head assembly 26 away from the gear box assembly 24, the paper path from the head carriage assembly 22 through the gear box assembly 24 is accessible. From this position the invention contemplates that the paper path can be easily examined for stranded or stack paper without the removal of any system component.

FIGS. 3–12 presented an embodiment of the invention utilizing the Apple Stylewriter series Inkjet printing mechanism. As stated earlier, the depiction of the invention utilizing an ink printer is not meant to limit the invention to this printing mechanism. Instead, the invention contemplates usefulness with all printing mechanisms, including dot matrix and laser printers.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus for utilizing a single paper path for scanning, faxing, copying, and printing, comprising:
   a printer chassis with a mechanism for printing a sheet of paper;
   a motor coupled to the printer chassis;
   a gear box assembly coupled to the printer chassis and engaged to the motor, the gear box assembly including a scan head lift mechanism; and
   a scan head assembly slidably coupled to the printer chassis to define the paper path between the gear box assembly and the scan head, a first paper path opening defined by a first distance between the gear box assembly and the scan head, the first paper path opening for scanning, faxing, and copying an image, and a second paper path opening defined by a second distance between the gear box assembly and the scan head for printing or reproducing an image or receiving an image by facsimile the second distance greater than the first distance, and the first distance actuated to the second distance by the scan head lift mechanism.

2. The apparatus according to claim 1, wherein the printer chassis includes at least one drive gear rotated by the motor about an axis that is parallel to the width of the printer chassis.

3. The apparatus of claim 2, wherein the gear box assembly further comprises:
   a gear train with at least one roller gear engaged to the drive gear of the motor;
   a cylindrical first platen roller shaft having a first end and a second end and extending substantially the length of the gear box assembly and seated in the gear box assembly and rotatably coupled at the first end to the gear train to rotate about an axis that is parallel to the width of the printer chassis; and
   a cylindrical first platen roller attached through its axis to the first platen roller shaft.

4. The apparatus of claim 3, wherein the scan head lift mechanism comprises:
   a sector gear coupled through the sector gear's center to the first end of the first platen roller shaft;
   a winged carriage coupled at its center to the first platen roller shaft adjacent to the sector gear;
   a pair of idlers rotatably coupled to axes parallel to and on either side of the first platen roller shaft, wherein the winged carriage engages one idler and the idler engages the sector gear to move the scan head between the first position and the second position.

5. The apparatus of claim 4, wherein the mechanism for printing is an ink printer with an ink head carriage that holds an ink printing cartridge.

6. The apparatus of claim 3, wherein the gear box assembly includes at least one auxiliary roller rotatably coupled to the gear train and having an axis parallel to the first platen roller shaft.

7. An apparatus for utilizing a single paper path for scanning, faxing, copying, and printing, comprising:
   a printer chassis with a mechanism for printing a sheet of paper;
   a motor coupled to the printer chassis;
   a gear box assembly coupled to the printer chassis and engaged to the motor, the gear box assembly including:
   (1) a gear train with at least one roller gear engaged to a drive gear of the motor;
   (2) a cylindrical first platen roller shaft having a first end and a second end and extending substantially the length of the gear box assembly and seated in the gear box assembly and rotatable coupled at the first end to the gear train to rotate about an axis that is parallel to the width of the printer chassis;
   (3) a cylindrical first platen roller attached through its axis to the first platen roller shaft; and
   (4) a scan head lift mechanism;
   a scan head assembly slidably coupled to the printer chassis to define the paper path between the gear box assembly and the scan head, a first paper path opening defined by a first distance between the gear box assembly and the scan head, the first paper path opening for scanning, faxing, and copying an image, and a second paper path opening defined by a second distance between the gear box assembly and the scan head, the second paper path opening for printing or reproducing an image or receiving an image by facsimile, the second distance greater than the first distance, and the first distance actuated to the second distance by the scan head lift mechanism,
   wherein the scan head lift mechanism includes:
   (1) a sector gear coupled through the sector gears center to the first end of the first platen roller shaft;
   (2) a winged carriage coupled at its center to the first platen roller shaft adjacent to the sector gear;
   (3) a pair of idlers rotatably coupled to axes parallel to and on either side of the first platen roller shaft, wherein the winged carriage engages one idler and the idler engages the sector gear to move the scan head, and
   (4) a lock lever pivotally coupled to the gear train and having at least one end in the path of the head carriage, the lock lever to engage the wing carriage and change the position of the scan head based on the position of the head carriage.

8. The apparatus of claim 7, wherein the gear box assembly has a length approximately the width of the printer chassis.

9. The apparatus of claim 7, wherein the scan head has a length approximately the width of the printer chassis.

10. The apparatus of claim 7, wherein the printer chassis includes a front access door.

11. The apparatus of claim 10, wherein the scan head is slidably coupled to the front access door.

12. The apparatus of claim 7, wherein the lock lever has a second end engaged to an opto-electrical sensor wherein the sensor senses the position of scan head based on the position of the lock lever.

13. The apparatus of claim 7, wherein the printer chassis includes a second platen roller having a first end and a second end and extending substantially the width of the printer chassis and rotatably connected at its first end to the head carriage motor to rotate in a direction that is parallel to the width of the printer chassis.

14. An apparatus utilizing a single paper path for scanning, faxing, copying, and printing, comprising:
   a printer chassis with a mechanism for print, the printer chassis having a front portion, a read portion, a bottom portion, a height defining upper and lower portions, and a width;

a motor coupled to the lower portion of the rear portion of the printer chassis;

a gear box assembly with a top portion and a bottom portion and a length portion, the gear box assembly coupled to the bottom portion of the printer chassis and engaged to the motor, the gear box assembly including a scan head lift device; and a scan head with a top portion and a bottom portion and a length portion, the scan head slidably coupled to the front portion of the printer chassis to define the paper path between the top portion of the gear box assembly and the bottom portion of the scan head, the scan head further having a first horizontal position for scanning, faxing, and copying an image, and a second horizontal position for printing, reproducing an image or receiving an image by facsimile, the scan head actuated between the first horizontal position and the second horizontal position by the scan head lift device.

15. An apparatus utilizing a single paper path for scanning, faxing, copying, and ink printing, comprising:

a printer chassis with a front portion, a rear portion, a bottom portion, a height defining upper and lower portions, and a width;

a head carriage to hold an ink printing cartridge, the ink head carriage slidably coupled to the rear portion of the printer chassis;

a motor coupled to the lower portion of the rear portion of the printer chassis;

a gear box assembly with a top portion and a bottom portion and a length portion wherein the length portion is approximately the width of the printer chassis, the gear box assembly coupled to the bottom portion of the printer chassis and engaged to the motor, the gear box assembly including a scan head lift device; and a scan head with a top portion and a bottom portion and a length portion, wherein the length portion is approximately the width of the printer chassis, and wherein the scan head is slidably coupled to the front portion of the printer chassis to define the paper path between the top portion of the gear box assembly and the bottom portion of the scan head, wherein further the scan head has a first horizontal position for scanning, faxing, and copying an image, and a second horizontal position for printing or reproducing an image, the scan head actuated between the first horizontal position and the second horizontal position by the scan head lift device.

16. An apparatus for using a single paper path for scanning and printing comprising:

a printer chassis with a mechanism for printing a sheet of paper;

a motor coupled to the printer chassis;

a gear box assembly coupled to the printer chassis and engaged to the motor, the gear box assembly including a scan head lift mechanism; and a scan head assembly slidably coupled to the printed chassis to define the paper path between the gear box assembly and the scan head, a first paper path opening defined by a first distance between the gear box assembly and the scan head, the scan head further having a first paper path opening for scanning and a second paper path opening defined by a second distance between the gear box assembly and the scan head for printing, the second distance greater than the first distance and the first distance actuated to the second distance by the scan head lift mechanism.

17. The apparatus according to claim 16, wherein the printer chassis includes at least one drive gear rotated by the motor about an access that is parallel to the width of the printer chassis.

18. The apparatus of claim 17, wherein the gear box assembly further comprises:

a gear train with at least one roller gear engaged to the drive gear of the motor;

a cylindrical first platen roller shaft having a first end and a second end and extending substantially the length of the gear box assembly and seated in the gear box assembly and rotatably coupled at the first end to the gear train to rotate about an axis that is parallel to the width of the printer chassis; and a cylindrical first platen roller attached through the first platen roller shaft.

19. The apparatus of claim 18, wherein the scan head lift mechanism comprises:

A sector gear coupled through the sector gear's center to the first end of the first platen roller shaft;

a winged carriage coupled at its center to the first platen roller shaft adjacent to the sector gear;

a pair of idlers rotatably coupled to axes parallel to and on either side of the first platen roller shaft wherein the winged carriage engages one idler and the idler engages the sector gear to move the scan head between the first position and the second position.

20. The apparatus of claim 19, wherein the apparatus includes uses for faxing and copying functions.

* * * * *

UNITED STATES PATENT AND TRADEMARK OFFICE
CERTIFICATE OF CORRECTION

PATENT NO. : 5,760,926
DATED : June 2, 1998
INVENTOR(S) : Howard, et al.

It is certified that error appears in the above-identified patent and that said Letters Patent is hereby corrected as shown below:

On the title page at [22], delete "Oct. 20, 1996" and insert --Oct. 20, 1995--

Signed and Sealed this

Twenty-ninth Day of February, 2000

Attest:

Q. TODD DICKINSON

Attesting Officer

Commissioner of Patents and Trademarks